(12) United States Patent
Cohen et al.

(10) Patent No.: US 7,013,635 B2
(45) Date of Patent: Mar. 21, 2006

(54) AUGMENTOR WITH AXIALLY DISPLACED VANE SYSTEM

(75) Inventors: Jeffrey M. Cohen, Hebron, CT (US); Meredith Bright Colket, III, Simsbury, CT (US); Scott A. Liljenberg, Wethersfield, CT (US); Andrzej Banaszuk, Simsbury, CT (US); Derk S. Philippona, Tolland, CT (US); Jeffery A. Lovett, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 155 days.

(21) Appl. No.: 10/748,531

(22) Filed: Dec. 30, 2003

(65) Prior Publication Data

US 2005/0144932 A1 Jul. 7, 2005

(51) Int. Cl.
*F02K 3/10* (2006.01)

(52) U.S. Cl. .............................. 60/204; 60/725; 60/761
(58) Field of Classification Search .................. 60/204, 60/725, 735, 761, 762, 763, 764, 765, 766, 60/776
See application file for complete search history.

(56) References Cited

U.S. PATENT DOCUMENTS

| | | | | |
|---|---|---|---|---|
| 2,520,967 A | * | 9/1950 | Schmitt | 60/735 |
| 2,866,313 A | * | 12/1958 | Holl | 60/765 |
| 2,927,423 A | * | 3/1960 | Wisniowski | 60/765 |
| 3,041,836 A | * | 7/1962 | Truman et al. | 60/725 |
| 3,437,173 A | | 4/1969 | Ehrich | |
| 3,747,345 A | * | 7/1973 | Markowski | 60/762 |
| 4,185,458 A | | 1/1980 | Ernst | |
| 4,203,285 A | | 5/1980 | Hanloser et al. | |
| 4,817,378 A | | 4/1989 | Giffin, III et al. | |
| 4,833,881 A | | 5/1989 | Vdoviak et al. | |
| 4,901,527 A | | 2/1990 | Nash et al. | |
| 4,989,407 A | | 2/1991 | Grant, Jr. | |
| 5,417,056 A | | 5/1995 | Johnson et al. | |
| 5,685,140 A | | 11/1997 | Clements et al. | |
| 5,775,098 A | | 7/1998 | Philippona | |
| 6,125,627 A | | 10/2000 | Rice et al. | |

OTHER PUBLICATIONS

Gordon C. Oates, "The Aerothermodynamics of Aircraft Gas Turbine Engines," pp. 21-45 to 21-50.

* cited by examiner

*Primary Examiner*—Louis J. Casaregola
(74) *Attorney, Agent, or Firm*—Carlson, Gaskey & Olds

(57) ABSTRACT

An augmentor system minimizes acoustic pressure fluctuations on the heat release process within the augmentor by staggering the vanes therein. The alternating axial vane stagger pattern arranges the downstream set of vanes as baffles which prevent the propagation of tangential acoustic waves between the vanes to protect the upstream set of vanes from the effects of transverse acoustic velocity fluctuations which minimizes screech without substantially affecting augmentor performance.

12 Claims, 2 Drawing Sheets

AUGMENTOR WITH AXIALLY DISPLACED VANE SYSTEM

BACKGROUND OF THE INVENTION

The present invention relates to a gas turbine engine augmentor, and more particularly to an augmentor segment which reduces screech.

Augmentors, or "afterburners" increase the thrust of a gas turbine engine. Additional thrust is produced within an augmentor when oxygen contained within the core gas flow of the engine is mixed with fuel and burned. In some instances, additional thrust is produced by mixing and burning fuel with cooling or bypass air entering the augmentor through the inner liner of the augmentor shell as well.

One type of augmentor includes radially oriented vanes, which are circumferentially disposed around a central tail cone. The vanes include a plurality of fuel distribution apertures positioned on both sides of a line of high-pressure air apertures. The fuel distribution apertures provide fuel distribution and the line of high-pressure air apertures collectively provide pneumatic bluff bodies analogous to prior art mechanical flame holders.

Screech is a term known in the art as high-frequency pressure oscillations induced by intense combustion, which, under certain conditions, are generated in the augmentor. Uncontrolled screech reduces the high-cycle fatigue life of the augmentor due to primarily three modes of screech-induced vibration including radial, circumferential, axial, and combinations thereof.

Gas turbine engine augmentors typically include cooling liners which provide for shielding the structural augmentor casing from hot augmentor combustion gases, for providing cooling air to an exhaust nozzle disposed at the downstream end of the augmentor and for providing screech suppression. Augmentor combustion efficiency is directly proportional to the amount of available discharge gases utilized in the combustion process. Any quantity of engine discharge gas that is utilized for cooling and screech suppression and not used in the augmentor combustion process decreases augmentor thrust capability and efficiency.

Augmentors are relatively long structures when compared to overall engine size and must accommodate relatively high combustion gas temperatures. Conversely, as engine packaging constraints are reduced to minimize thermal and radar signatures, less space is available for the augmentor cooling and screech suppression systems.

Accordingly, it is desirable to provide a gas turbine engine augmentor that minimizes screech without substantially affecting augmentor performance.

SUMMARY OF THE INVENTION

The augmentor section according to the present invention minimizes acoustic pressure fluctuations on the heat release process within the augmentor by staggering the vanes therein.

Combustion that occurs downstream of the vanes is affected by the resonant acoustic pressure fluctuations within the augmentor. The acoustic pressure fluctuation typically relate to a "tangential" mode and cause fluctuation in the combustion heat release. When the heat release fluctuations are in-phase with the acoustic pressure fluctuations, the process is unstable and the pressure fluctuations are amplified.

Screech is a phenomenon in which the combustion that occurs downstream of the vanes is affected by resonant acoustic pressure fluctuations in the augmentor. These acoustic pressure fluctuations usually relate to a "tangential" acoustic mode and cause fluctuations in the combustion heat release. When these heat release fluctuations are in-phase with the acoustic pressure fluctuations, the process is unstable and the pressure fluctuations are amplified. Large pressure fluctuations result in excessive noise and vibration and decreased component durability.

The alternating axial vane stagger pattern arranges the downstream set of vanes as "baffles" to prevent and/or dampen the propagation of tangential acoustic waves between the vanes thereby protecting the flame stabilization location on the upstream set of vanes from the effects of transverse acoustic velocity fluctuations to minimize screech without substantially affecting augmentor performance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
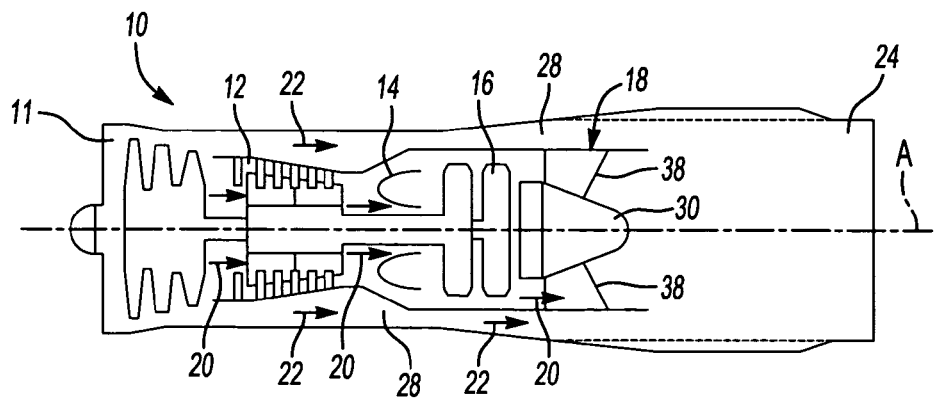
FIG. 1 is a general diagrammatic sectional view of a gas turbine engine.

FIG. 1 illustrates a general schematic view of a gas turbine engine 10. The gas turbine engine 10 is defined about an engine centerline axis A about which the various engine sections rotate. The engine 10 typically includes a fan section 11, a compressor section 12, a combustor 14, a turbine section 16, and an augmentor section 18 defined along the engine axis A. It should be understood that although a particular arrangement is disclosed in the illustrated embodiment, other arrangements will benefit from the instant invention.

Air entering the fan section 11 is divided between core gas flow 20 and bypass air flow 22. The core gas flow 20 generally follows a path essentially parallel to the axis A of the engine 10, through the compressor section 12, combustor 14, turbine section 16, and augmentor section 18. Bypass air 22 also follows a path parallel to the axis 26 of the engine 10, passing through an annulus 28 along the periphery of the engine 10.

Core gas flow 20 follows a path initially passing through the compressor section 12 and subsequently through the combustor 14 and turbine section 16. The core gas flow 20 passes through the augmentor section 12, where fuel is selectively added, mixed with the flow 20 and burned to impart more energy to the flow 20 and consequently more thrust exiting the nozzle 24 of the engine 10.

Figure 2:
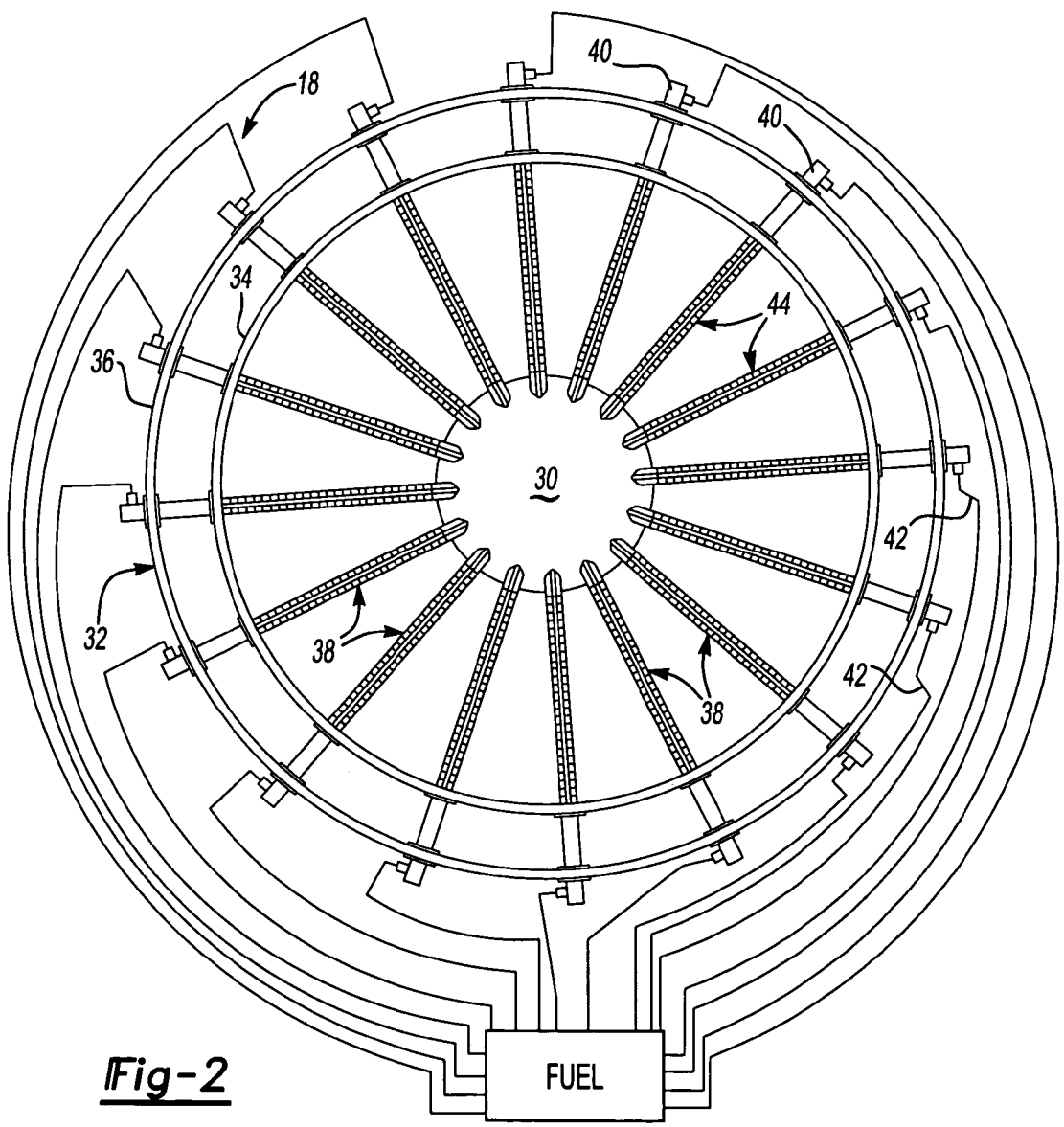
FIG. 2 is a an expanded diagrammatic view of an augmentor shown from the rear of the engine.

Referring to FIG. 2, an end view of the augmentor section 18 is illustrated as viewed from the rear of the engine 10. The augmenter section 18 includes a central cone 30, a case 32 having an inner lining 34, an outer wall 36, and a plurality of circumferentially disposed vanes 38 extending radially outward from the cone 30 to the inner lining 34.

One or more fuel distributors 40 are attached to the outer wall 36 of the case 32. Fuel feed lines 42 extending from a fuel supply are coupled to the fuel distributors 40 to distribute fuel into each vane 38 and out of a multiple of fuel injection orifices 44.

In operation, when the augmentor section 18 is actuated, fuel is admitted into a fuel distribution system within each of the vanes 38 and exits the multiple of fuel injection orifices 44 to extend out a distance into the core gas flow 20. After distribution from the vanes 38, the fuel mixes with the core gas flow 20 and the bypass air 22 introduced in the core gas flow 20. This mixture is combusted and proceeds downstream to increase the thrust of the engine 10 (FIG. 1). For further understanding of other aspects of the augmentor operation, attention is directed to U.S. Pat. No. 5,685,140 METHOD FOR DISTRIBUTING FUEL WITHIN AN AUGMENTOR which is assigned to the assignee of the instant invention and which is hereby incorporated herein in its entirety.

Figure 3:
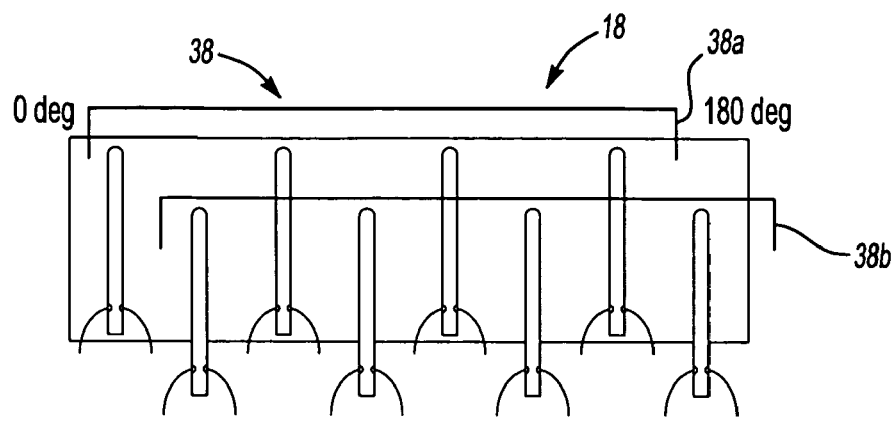
FIG. 3 is a "unwrapped" radial view of an augmentor illustrating the axial vane arrangement.

Referring to FIG. 3, an "unwrapped" radial view of the vanes 38 is illustrated. The vanes 38 are preferably arranged in an axial displaced arrangement in which a first set of vanes 38a are located axially upstream of a second set of vane 38b. That is, the second set of vanes 38b are setback from the first set of vanes 38a. Preferably, the vanes are arranged in a 2-vane alternating axial stagger pattern.

The alternating axial stagger pattern provides numerous benefits. The downstream set of vanes 38b operate as "baffles" which prevent the propagation of tangential acoustic waves between the vanes 38 thereby "protecting" the flame anchoring locations on the upstream set of vanes 38a from the effects of transverse acoustic velocity fluctuations. The "setback" distance between the trailing edges of the two sets of vanes is preferably arranged such that the heat release responses of the flame systems from the sets of vanes 38a, 38b are out of phase with each other when subjected to longitudinal velocity fluctuation. It should be understood that the actual distance relationship of the setback is well within the knowledge of one of ordinary skill in the art of augmentor design.

Figure 4:
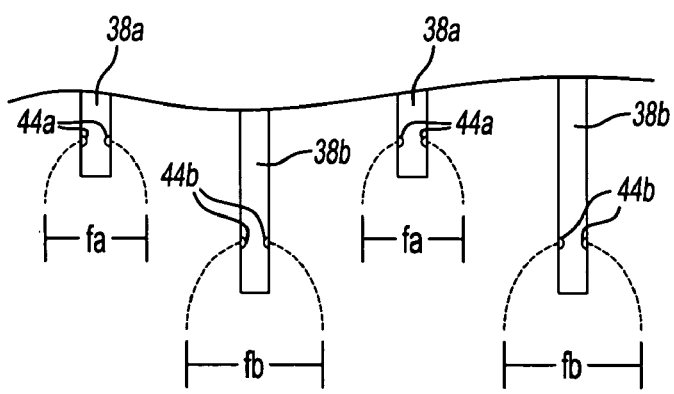
FIG. 4 is a schematic view of fuel disbursement from vanes within the augmentor of the present invention.

Referring to FIG. 4, the upstream set of vanes 38a include fuel injection orifices 44a which provide low fuel jet penetration into the air stream. That is, the fuel injection orifices 44a in the first set of vanes exits discharges fuel Fa to extend out a distance from the vane 38a less than the distance fuel Fb exits from fuel orifices 40b defined in the second set of vanes 38b. This pattern enriches fuel in the wake behind the first set of vanes 38a and provides enhanced flame anchoring. The downstream set of vanes 38b preferably include fuel injection orifices 44b which provide fuel jet penetration into the air stream equal to or greater than the first set of vanes 38a. The actual penetration of the fuel jets from the sets of vanes is tailored depending on radial position for optimal augmentor efficiency. This arrangement increases fuel/air mixing in the augmentor section 18, leading to higher combustion efficiency. The flame anchoring characteristics of the downstream set of vanes 38b also provide increased heat input from the flames attached to the upstream vanes 38a.

Figure 5:
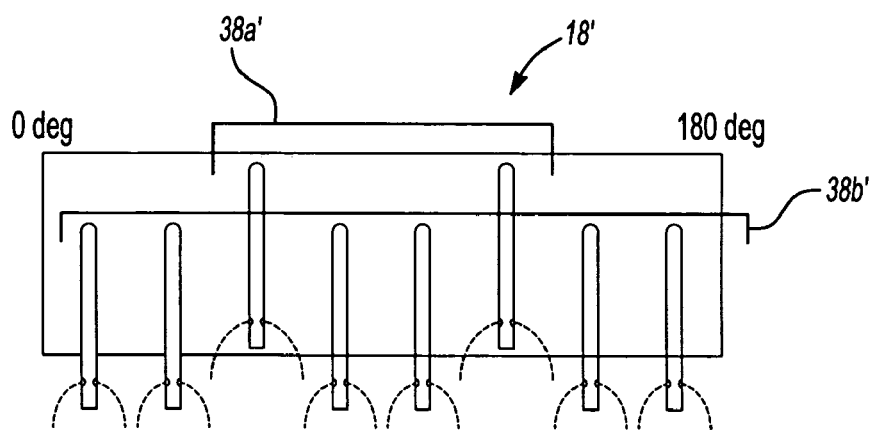
FIG. 5 is another "unwrapped" radial view of an augmentor designed according to the present invention.

Referring to FIG. 5, another vane pattern is illustrated. The vane pattern differs from the FIG. 3, pattern in that every third vane is part of the first set of vanes 38a' which are located axially forward of a second set of vane 38b'. It should be understood that any pattern and/or spacing arrangement of axially displaced vane sets will benefit from the present invention, including as few as just a single downstream vane to baffle the tangential waves.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is,exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An augmentor section comprising:
    a first set of vanes having at least one vane with at least one fuel injection orifice; and
    a second set of vanes having at least one vane with at least one fuel injection orifice, at least one of said second set of vanes axially displaced from at least one of said first set of vanes.

2. The augmenter section as recited in claim 1, wherein said first set of vanes and said second set of vanes are arranged in a 2-vane alternating axial stagger pattern.

3. The augmentor section as recited in claim 1, further comprising a first set of fuel injection orifices within each of said first set of vanes and a second set of fuel injection orifices within each of said second set of vanes.

4. A gas turbine engine augmenter section comprising:
    a central cone defined along an engine axis;
    an inner lining;
    a first set of vanes having at least one fuel injection orifice located between said central cone and said inner liner, and
    a second set of vanes having at least one fuel injection orifice located between said central cone and said inner liner, said second set of vane axially displaced from said first set of vanes.

5. The gas turbine engine augmentor section as recited in claim 4, wherein said first set of vanes and said second set of vanes are arranged in a 2-vane alternating axial stagger pattern.

6. The gas turbine engine augmentor section as recited in claim 4, further comprising a first set of fuel exit orifices within each of said first set of vanes and a second set of fuel exit orifices within each of said second set of vanes.

7. A method of minimizing screech within an augmentor section of a gas turbine engine comprising the step of:
    locating a first set of vanes having at least one vane with at least one fuel injection orifice and second set of vanes having at least one vane with at least one fuel injection orifice within the augmentor section such that the flame systems from the at least one fuel injection orifice of the first set of vanes and the at least one fuel injection orifice of the second set of vanes are out of phase when subjected to longitudinal velocity fluctuation.

8. A method as recited in claim 7, further comprising the steps of:
providing a first fuel jet airflow penetration from the first set of vanes; and
providing a second fuel jet airflow penetration from the second set of vanes, the second fuel jet airflow penetration greater than the first fuel jet airflow penetration.

9. A method as recited in claim 7, further comprising the step of:
axially displacing the first set of vanes from the second set of vanes.

10. A method as recited in claim 7, further comprising the step of:
axially displacing the first set of vanes upstream from the second set of vanes in an alternating pattern.

11. An augmentor section comprising:
a first set of vanes; and
a second set of vanes axially displaced from said first set of vanes wherein said first set of vanes and said second set of vanes are arranged in a 2-vane alternating axial stagger pattern.

12. A method of minimizing screech within an augmentor section of a gas turbine engine comprising the step of:
locating a first and second set of vanes within the augmentor section such that the flame systems from the sets of vanes are out of phase when subjected to longitudinal velocity fluctuation;
providing a first fuel jet airflow penetration from the first set of vanes; and
providing a second fuel jet airflow penetration from the second set of vanes, the second fuel jet airflow penetration greater than the first fuel jet airflow penetration.

* * * * *